(12) United States Patent
Jain et al.

(10) Patent No.: US 8,887,239 B1
(45) Date of Patent: Nov. 11, 2014

(54) ACCESS TO NETWORK CONTENT

(75) Inventors: Arvind Jain, Los Altos, CA (US);
Sreeram Ramachandran, Cupertino, CA (US)

(73) Assignee: Google Inc., Mountain View, CA (US)

( * ) Notice: Subject to any disclaimer, the term of this patent is extended or adjusted under 35 U.S.C. 154(b) by 219 days.

(21) Appl. No.: 13/569,477

(22) Filed: Aug. 8, 2012

(51) Int. Cl.
*H04L 29/06* (2006.01)
*G06F 21/12* (2013.01)
*H04L 12/24* (2006.01)
*G06F 17/30* (2006.01)

(52) U.S. Cl.
CPC ............ *G06F 21/128* (2013.01); *H04L 41/0253* (2013.01); *H04L 12/2408* (2013.01); *G06F 17/30861* (2013.01)
USPC .......................................................... 726/3

(58) Field of Classification Search
CPC ............ G06F 21/128; G06F 17/30861; H04L 12/2408; H04L 41/0253
USPC .......................................................... 726/3
See application file for complete search history.

(56) References Cited

U.S. PATENT DOCUMENTS

| | | | |
|---|---|---|---|
| 5,715,445 A | 2/1998 | Wolfe | |
| 5,727,129 A | 3/1998 | Barrett et al. | |
| 5,946,682 A | 8/1999 | Wolfe | |
| 6,055,569 A | 4/2000 | O'Brien et al. | |
| 6,100,871 A | 8/2000 | Min | |
| 6,151,603 A | 11/2000 | Wolfe | |
| 6,182,133 B1 | 1/2001 | Horvitz | |
| 6,256,712 B1 | 7/2001 | Challenger et al. | |
| 6,301,576 B1 | 10/2001 | Wolfe | |
| 6,467,029 B1 | 10/2002 | Kitayama | |
| 6,604,103 B1 | 8/2003 | Wolfe | |
| 6,976,090 B2 | 12/2005 | Ben-Shaul et al. | |
| 7,047,502 B2 | 5/2006 | Petropoulos et al. | |
| 7,103,594 B1 | 9/2006 | Wolfe | |
| 7,155,336 B2 | 12/2006 | Dorfman et al. | |
| 7,277,924 B1 | 10/2007 | Wichmann et al. | |
| 7,428,701 B1 | 9/2008 | Gavin et al. | |
| 7,467,137 B1 | 12/2008 | Wolfe | |

(Continued)

FOREIGN PATENT DOCUMENTS

| | | |
|---|---|---|
| JP | 2004536389 A | 12/2004 |
| KR | 20070101237 A | 10/2007 |

(Continued)

OTHER PUBLICATIONS

International Search Report and Written Opinion for Application No. PCT/US2012/055473 dated Feb. 26, 2013.

(Continued)

*Primary Examiner* — Michael S McNally
(74) *Attorney, Agent, or Firm* — Lerner, David, Littenberg, Krumholz & Mentlik, LLP (57) ABSTRACT

A method and system for improving access to search results are provided in the disclosure herein. Aspects of this disclosure minimize the delay in accessing network content by priming certain regularly viewed content (e.g., a search engine home page or a web search page) in a hidden browser instance. As the user accesses the content prerendered in the invisible browser instance, a new instance of the prerendered content is created to facilitate future accesses to the network content (e.g., future search queries). The security state of the network content may be determined and/or monitored, and appropriate action taken in response to a change in the security state.

22 Claims, 8 Drawing Sheets

(56) References Cited

U.S. PATENT DOCUMENTS

| | | | |
|---|---|---|---|
| 7,480,669 B2 | 1/2009 | Lo et al. | |
| 7,487,147 B2 | 2/2009 | Bates et al. | |
| 7,536,635 B2 | 5/2009 | Racovolis et al. | |
| 7,613,712 B2 | 11/2009 | Greenblatt et al. | |
| 7,631,032 B1* | 12/2009 | Refuah et al. | 709/201 |
| 7,716,332 B1 | 5/2010 | Topfl et al. | |
| 7,747,749 B1 | 6/2010 | Erikson et al. | |
| 7,802,305 B1 | 9/2010 | Leeds | |
| 7,805,673 B2 | 9/2010 | der Quaeler et al. | |
| 7,840,589 B1 | 11/2010 | Holt et al. | |
| 7,876,335 B1 | 1/2011 | Pittenger et al. | |
| 7,908,336 B2 | 3/2011 | Carlson et al. | |
| 8,112,308 B1 | 2/2012 | Ho et al. | |
| 8,260,938 B2 | 9/2012 | Gupta et al. | |
| 8,504,907 B2 | 8/2013 | Piersol | |
| 2002/0075333 A1 | 6/2002 | Dutta et al. | |
| 2003/0005038 A1 | 1/2003 | Codella et al. | |
| 2003/0050906 A1 | 3/2003 | Clifton-Bligh | |
| 2003/0061451 A1 | 3/2003 | Beyda | |
| 2003/0088580 A1 | 5/2003 | Desai et al. | |
| 2003/0182390 A1 | 9/2003 | Alam | |
| 2003/0212760 A1 | 11/2003 | Chen et al. | |
| 2004/0267600 A1 | 12/2004 | Horvitz | |
| 2004/0268228 A1 | 12/2004 | Croney et al. | |
| 2005/0055426 A1 | 3/2005 | Smith et al. | |
| 2005/0132296 A1 | 6/2005 | Milic-Frayling et al. | |
| 2005/0240576 A1 | 10/2005 | Piscitello et al. | |
| 2005/0251396 A1 | 11/2005 | Tyler | |
| 2006/0047804 A1 | 3/2006 | Fredricksen et al. | |
| 2006/0064411 A1 | 3/2006 | Gross et al. | |
| 2006/0143568 A1 | 6/2006 | Milener et al. | |
| 2006/0282771 A1 | 12/2006 | Vinci | |
| 2007/0005425 A1 | 1/2007 | Bennett et al. | |
| 2007/0198634 A1 | 8/2007 | Knowles et al. | |
| 2007/0204057 A1 | 8/2007 | Shaver et al. | |
| 2007/0208704 A1 | 9/2007 | Ives | |
| 2007/0220010 A1 | 9/2007 | Ertugrul | |
| 2007/0226633 A1 | 9/2007 | Lyle et al. | |
| 2007/0260585 A1* | 11/2007 | Bodine et al. | 707/3 |
| 2007/0288648 A1 | 12/2007 | Mehanna et al. | |
| 2008/0052219 A1 | 2/2008 | Sandholm et al. | |
| 2008/0104407 A1 | 5/2008 | Horne et al. | |
| 2008/0140941 A1 | 6/2008 | Dasgupta et al. | |
| 2008/0201332 A1 | 8/2008 | Souders et al. | |
| 2008/0208789 A1 | 8/2008 | Almog | |
| 2008/0249969 A1 | 10/2008 | Tsui et al. | |
| 2008/0256134 A1 | 10/2008 | Bogner et al. | |
| 2008/0295006 A1 | 11/2008 | LuVogt et al. | |
| 2008/0320222 A1 | 12/2008 | Dhodapkar | |
| 2009/0013006 A1 | 1/2009 | Friedl et al. | |
| 2009/0070392 A1 | 3/2009 | Le Roy et al. | |
| 2009/0094196 A1 | 4/2009 | Piwowarski et al. | |
| 2009/0106349 A1 | 4/2009 | Harris | |
| 2009/0132949 A1 | 5/2009 | Bosarge | |
| 2009/0158221 A1 | 6/2009 | Nielsen et al. | |
| 2009/0171930 A1 | 7/2009 | Vaughan et al. | |
| 2009/0210806 A1 | 8/2009 | Dodson et al. | |
| 2009/0216639 A1 | 8/2009 | Kapczynski et al. | |
| 2009/0265774 A1 | 10/2009 | Malik et al. | |
| 2009/0327424 A1 | 12/2009 | Bernstein et al. | |
| 2010/0005061 A1 | 1/2010 | Basco et al. | |
| 2010/0023581 A1 | 1/2010 | Lahav | |
| 2010/0031366 A1 | 2/2010 | Knight et al. | |
| 2010/0107115 A1 | 4/2010 | Sareen et al. | |
| 2010/0131902 A1 | 5/2010 | Teran et al. | |
| 2010/0191856 A1 | 7/2010 | Gupta et al. | |
| 2010/0251116 A1 | 9/2010 | Rimas-Ribikauskas et al. | |
| 2010/0306665 A1 | 12/2010 | Milic-Frayling et al. | |
| 2011/0029518 A1 | 2/2011 | Tong | |
| 2011/0029670 A1 | 2/2011 | Klein et al. | |
| 2011/0066732 A1 | 3/2011 | Iwade et al. | |
| 2011/0119361 A1 | 5/2011 | Issa et al. | |
| 2011/0173569 A1 | 7/2011 | Howes et al. | |
| 2011/0199304 A1 | 8/2011 | Walley et al. | |
| 2011/0225494 A1 | 9/2011 | Shmuylovich et al. | |
| 2011/0289317 A1 | 11/2011 | Darapu et al. | |
| 2012/0017146 A1 | 1/2012 | Travieso et al. | |
| 2012/0084644 A1 | 4/2012 | Robert et al. | |
| 2012/0110435 A1* | 5/2012 | Green | 715/234 |
| 2012/0137201 A1 | 5/2012 | White et al. | |
| 2012/0158740 A1 | 6/2012 | Smola et al. | |
| 2012/0254721 A1 | 10/2012 | Jain et al. | |
| 2012/0254727 A1 | 10/2012 | Jain et al. | |
| 2012/0324043 A1 | 12/2012 | Burkard et al. | |

FOREIGN PATENT DOCUMENTS

| | | |
|---|---|---|
| KR | 20080111822 | 12/2008 |
| KR | 20100102858 A | 9/2010 |
| KR | 20100112512 | 10/2010 |

OTHER PUBLICATIONS

StackOverflow.com, "Detect if Browser Tab Has Focus," Sep. 2011, 2 pages.

International Search Report & Written Opinion dated May 7, 2013 for Application No. PCT/US2013/021927.

U.S. Appl. No. 13/472,019, filed May 15, 2012.

https://developer.mozilla.org/en/Link_prefetching_FAQ (2003).

U.S. Appl. No. 13/233,314, filed Sep. 15, 2011.

U.S. Appl. No. 13/175,067, filed Jul. 1, 2011.

U.S. Appl. No. 13/100,615, filed May 4, 2011.

U.S. Appl. No. 13/308,757, filed Dec. 1, 2011.

U.S. Appl. No. 13/233,300, filed Sep. 15, 2011.

U.S. Appl. No. 13/182,920, filed Jul. 14, 2011.

U.S. Appl. No. 13/183,824, filed Jul. 15, 2011.

U.S. Appl. No. 13/174,925, filed Jul. 1, 2011.

U.S. Appl. No. 13/174,928, filed Jul. 1, 2011.

U.S. Appl. No. 13/175,115, filed Jul. 1, 2011.

U.S. Appl. No. 13/268,279, filed Oct. 7, 2011.

Christopher Schmitt, "CSS Cookbook, Third Edition," O'Reilly Media, Dec. 24, 2009, pp. 1, 33, 35 and 217-219.

Venoila et al. "T-Cube: A Fast, Self-Disclosing Pen-Based Alphabet". Copyright Date 1994.

Guimbretiere et al. "FlowMenu: Combining Command, Text, and Data Entry". Copyright 2000.

U.S. Appl. No. 13/353,626, filed Jan. 19, 2012.

International Search Report dated Nov. 28, 2012, in International Application No. PCT/US2012/036519.

International Search Report and Written Opinion dated Dec. 14, 2012 for PCT application US2012044896.

Fisher, Darin,"Link Prefetching FAQ," dated Mar. 3, 2003, published by Mozilla Developer Network (MDN), from https://developer.mozilla.org/en/Link_prefetching_FAQ (2003).

International Search Report and Written Opinion for Application No. PCT/US2012/042186 dated Feb. 20, 2013.

International Search Report and Written Opinion for Application No. PCT/US2013/062245 dated Jan. 28, 2014.

* cited by examiner

ACCESS TO NETWORK CONTENT

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. The user is typically idle while waiting for their requested site to load. While high-speed Internet access may limit this delay to a few seconds, even this short delay can add up to thousands of man-hours of lost productivity each year.

BRIEF SUMMARY

A method and system for improving access to network content are provided in the disclosure herein. Aspects of this disclosure minimize the delay in accessing network content by prerendering elements of a content page. The network content, such as a web search page or a search engine home page, may be prerendered in a hidden browser instance when the browser is executed. Aspects of the disclosure may provide a search query to the network content via an application programming interface (API) such as a search API. The prerendered network content may be made visible in response to a selection operation indicating that the user wishes to access the prerendered network content (e.g., selection of a "home page" button, entry of a search query), thus allowing for immediate display of the network content. After the user accesses the prerendered network content, a new instance of the network content may be prerendered. For example, when the user performs a search query, a new instance of a search page may be prerendered after the original prerendered search page is merged with the visible browser instance to prepare for a future search query.

The prerendered network content may be periodically evaluated for compliance with a security scheme. If a user has authenticated or "logged in" to a particular web page or web site, interactions with the prerendered network content may be performed using a secure protocol, such as a Secure Socket Layer ("SSL") interface. The prerendered network content may be evaluated for compliance at a particular time interval, in response to detection of a user input associated with the content, or any other method for identifying a possible change in security status of the network content. Upon detection of a change in security status, the network content may be reloaded according to the security status, or any other appropriate processing may be performed.

Aspects of the disclosure describe a computer-implemented method for improving access to network content. The method may include prerendering, using a processor, a set of network content in a hidden browser instance, monitoring user input in a browser for a selection operation associated with the set of network content preloaded in the hidden browser instance, detecting the selection operation associated with the set of network content preloaded in the hidden browser instance, in response to a detection of the selection operation, merging, with the processor, the set of network content into an active browser instance, and creating a new instance of the set of network content in a new hidden browser instance for use in another selection operation associated with the set of network content. The set of network content may be a search engine web page and the selection operation may be at least one of entry of a search query in a text entry field or selection of a suggested search query. The set of network content may be a search engine home page and the selection operation may indicate that the user wishes to access the search engine home page. Prerendering the set of network content may include requesting the set of network content from a remote server. The new instance of the set of network content may be created by copying the set of network content received from the remote server without contacting the remote server a second time. The new instance of the set of network content may be created at a particular time interval after the selection operation. The new instance of the set of network content may be created based on a parameter received from a remote server that provided the network content. The new instance of the set of network content may be created immediately after the set of network content is merged with the active browser instance. The method may include notifying the set of network content preloaded in the hidden browser instance of the selection operation using an application programming interface. The set of network content may be determined by at least one of a user preference, a user navigation history, or a default search engine.

Aspects of the disclosure may provide a non-transitory computer readable storage medium containing instructions that, when executed by a processor, cause the processor to perform a method. The method performed by the processor may include prerendering, using a processor, a set of network content in a hidden browser instance, monitoring user input in a browser for a selection operation associated with the set of network content preloaded in the hidden browser instance, detecting the selection operation associated with the set of network content preloaded in the hidden browser instance, in response to a detection of the selection operation, merging the set of network content into an active browser instance, and creating a new instance of the set of network content in a new hidden browser instance for use in another selection operation associated with the set of network content. The set of network content may be a search engine web page and the selection operation may be at least one of entry of a search query in a text entry field or selection of a suggested search query. The set of network content may be a search engine home page and the selection operation indicates that the user wishes to access the search engine home page. Prerendering the set of network content may include requesting the set of network content from a remote server. The new instance of the set of network content may be created by copying the set of network content received from the remote server without contacting the remote server a second time. The new instance of the set of network content may be created at a particular time interval after the selection operation. The new instance of the set of network content may be created based on a parameter received from a remote server that provided the network content. The new instance of the set of network content may be created immediately after the set of network content is merged with the active browser instance. The method may include notifying the set of network content preloaded in the hidden browser instance of the selection operation using an application programming interface. The set of network content may be determined by at least one of a user preference, a user navigation history, or a default search engine.

Aspects of the disclosure may provide a processing system for improving access to search results. The processing system may include at least one processor, and a memory coupled to the at least one processor. The processor may be configured to execute a browser application, prerender a set of network content in a hidden instance of the browser application, such that at least some portion of the network content is rendered, monitor user input in the browser for a selection operation associated with the set of network content preloaded in the hidden browser instance, detect the selection operation associated with the set of network content preloaded in the hidden browser instance, in response to a detection of the selection operation, merge the set of network content into an active browser instance, and create a new instance of the set of network content in a new hidden browser instance for use in another selection operation associated with the set of network content. The set of network content may be at least one of a search engine home page or a search engine results page. The selection operation may be at least one of entry of a search query in a text field or selection of a suggested search query.

DETAILED DESCRIPTION

A method and system for improving access to search results are provided in the disclosure herein. Aspects of this disclosure minimize the delay in accessing network content by "priming" certain regularly viewed content (e.g., a search engine home page or a web search results page) in an invisible browser instance. As the user accesses the content prerendered in the invisible browser instance, a new instance of the prerendered content is created to facilitate future accesses to the network content (e.g., future search queries). Aspects of the disclosure may provide a search query to a preloaded search page via a search application programming interface (API).

All or part of the preloaded search web page may be made visible in response to the search query such that the user does not need to wait for rendering of the web page (e.g., fetching and rendering of page formatting, logos, scripts, and the like), thus allowing for immediate display of search results as soon as the results are received. Various methods for performing the prerendering operation, configuring the prerendering operation, and managing the prerendering operation are described. For the purposes of this application, the term "prerendering" generally refers to the act of requesting all resources (e.g., any executable code, scripting language, files, and/or interactive objects) necessary to load the content of a web address, and loading the content in a web browser instance. While "priming" generally involves loading regularly accessed network content into a hidden browser instance in a completely executed and rendered format.

Figure 1:
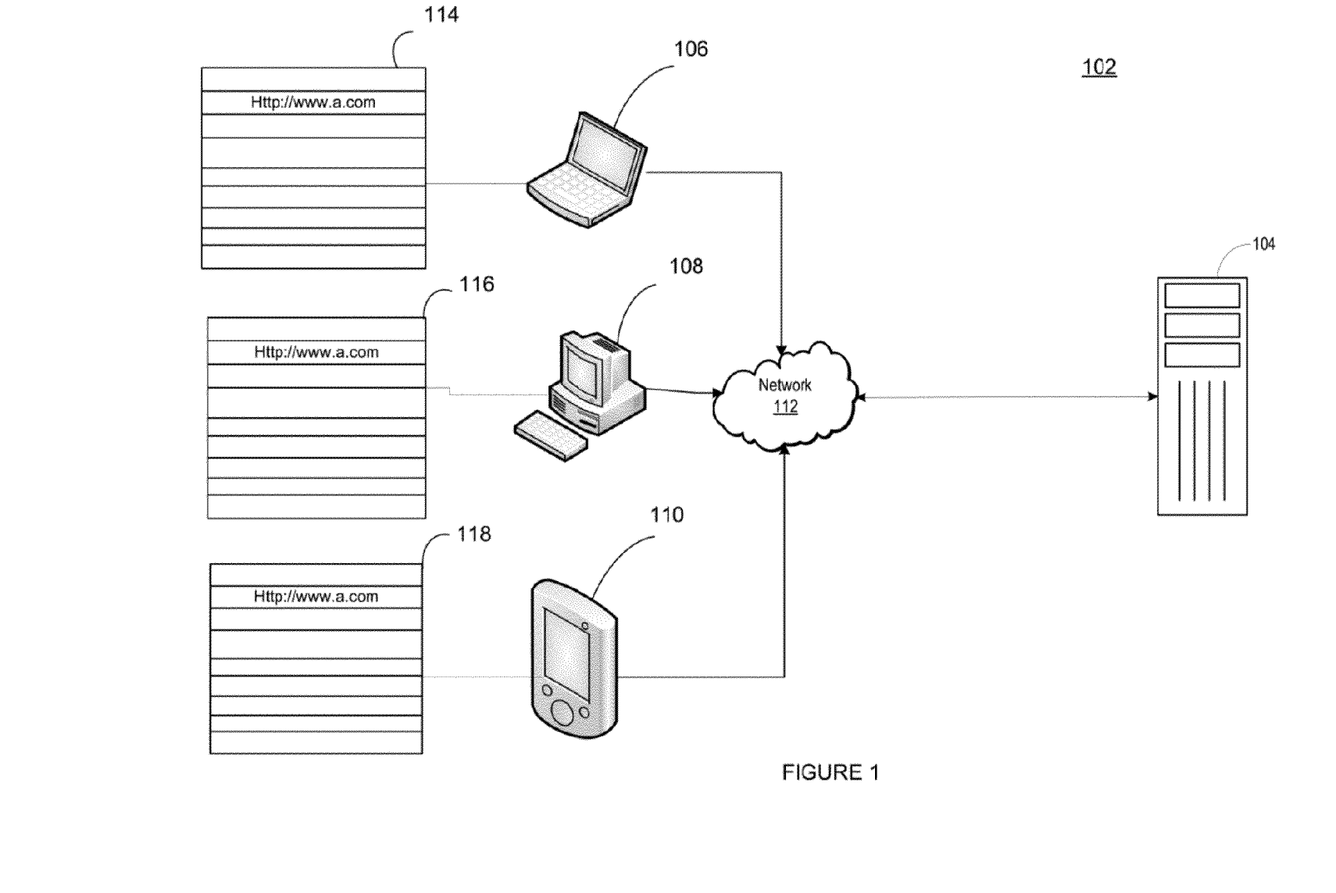
FIG. 1 is a system diagram depicting an example of a server in communication with example client devices in accordance with aspects of the disclosure.

As shown in FIG. 1, an example system 102 in accordance with one aspect includes a server 104 in communication with one or more client devices 106, 108, 110 displaying web browser interfaces 114, 116, 118. The user of the client device 106 may browse to a web page located at "www.a.com" as displayed on the web browser interface 114. That page includes content selectable by the user.

The client devices may be any device capable of managing data requests via a network 112. Examples of such client devices include a personal computer (PC) 108, a mobile device 110, or a server 106. The client devices 106, 108, 110 are operable to perform prerendering operations during the execution of a web browser application. In some aspects, the client devices 106, 108, 110 predict a search event by identifying cursor placement, text entry, or interface focus. The prerender operation may also be determined dynamically by, for example, a JAVASCRIPT code. While the concepts described herein are generally described with respect to a web browser interface 114, 116, 118 executing on a client device 106, 108, 110, aspects of the disclosure can also be applied to any computing node capable of managing navigation events over a network, including a server 104.

The client devices 106, 108, 110 may also comprise personal computers, personal digital assistants ("PDA"): tablet PCs, netbooks, laptops, mobile phones, etc. Indeed, client devices in accordance with the systems and methods described herein may comprise any device operative to process instructions and transmit data to and from humans and other computers including general purpose computers, network computers lacking local storage capability, etc.

The client devices 106, 108, 110 may be operable to predict search operations to assist in data access on the network 112. For example, the client devices may predict a search operation to facilitate prerendering of a search page in order to decrease delay in the display of network content, thus improving the user's browsing experience. In some aspects, the server 104 provides navigation data which may be used by the client devices 106, 108, 110 to predict a search operation. In some aspects, the client devices 106, 108, 110 predict a search operation using local data.

The network 112, and the intervening nodes between the server 104 and the client devices 106, 108, 110, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Although some functions are indicated as taking place on the server 104 and other functions are indicated as taking place on the client devices 106, 108, 110, various aspects of the system and method may be implemented by a single computer having a single processor. It should be appreciated that aspects of the system and method described with respect to the client may be implemented on the server, and vice-versa.

Figure 2:
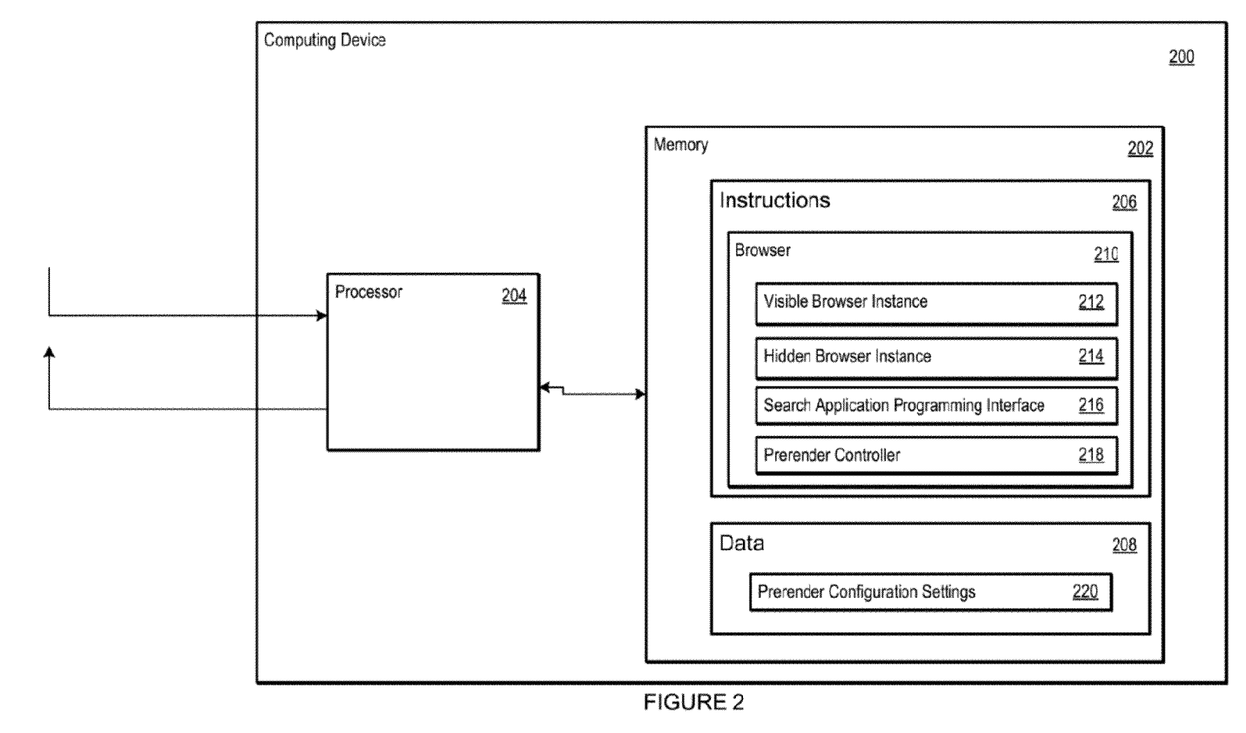
FIG. 2 is block diagram depicting an example of a computing device in accordance with aspects of the disclosure.

FIG. 2 is a block diagram depicting an example of a computing device 200, such as one of the client devices 106, 108, 110 described with respect to FIG. 1. The computing device 200 may include a processor 204, a memory 202 and other components typically present in general purpose computers. The memory 202 may store instructions 206 and data 208 that are accessible by the processor 204. The processor 204 may execute the instructions 206 and access the data 208 to control the operations of the computing device 200.

The memory 202 may be any type of tangible memory operative to store information accessible by the processor 204, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 206 may be any set of instructions to be executed directly (such as machine code) or indirectly (such as scripts) by the processor 204. For example, the instructions may be stored as computer code on a computer-readable medium. In that regard, the terms "instructions" and "programs" may be used interchangeably herein. The instructions 206 may be stored in object code format for direct processing by the processor 204, or in any other computer language including scripts or collections of independent source code modules that are interpreted on demand or compiled in advance. Functions, methods and routines of the instructions 206 are explained in more detail below (see FIGS. 3-8).

The data 208 may be retrieved, stored or modified by the processor 204 in accordance with the instructions 206. For instance, although the architecture is not limited by any particular data structure, the data 208 may be stored in computer registers, in a relational database as a table having a plurality of different fields and records, Extensible Markup Language ("XML") documents or flat files. The data may also be formatted in any computer readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 208 may comprise any information sufficient to identify the relevant information, such as numbers, descriptive text, proprietary codes, references to data stored in other areas of the same memory or different memories (including other network locations) or information that is used by a function to calculate the relevant data.

The processor 204 may be any suitable processor, such as various commercially available general purpose processors. Alternatively, the processor 204 may be a dedicated controller such as an application-specific integrated circuit ("ASIC").

Although FIG. 2 functionally illustrates the processor and memory as being within a single block, it should be understood that the processor 204 and memory 202 may actually comprise multiple processors and memories that may or may not be stored within the same physical housing. Accordingly, references to a processor, computer or memory will be understood to include references to a collection of processors, computers or memories that may or may not operate in parallel.

The computing device 200 may be at one node of a network and be operative to directly and indirectly communicates with other nodes of the network. For example, the computing device 200 may comprise a web server that is operative to communicate with client devices via the network such that the computing device 200 uses the network to transmit and display information to a user on a display of the client device.

The system can provide privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed. A user may also be provided with an opportunity to opt in/out to enable the collection of sharing of data.

In order to facilitate the prerendering and search operations of the computing device 200, the memory 202 may further comprise a browser 2102. Although the browser 210 is identified as a discrete module in connection with FIG. 2, the functionality of this module may overlap and/or exist in a fewer or greater number of modules than what is shown, with such modules residing at one or more processing devices, which may be geographically dispersed.

The browser 210 provides for the display of network content, such as a web page, to a user of the client device via a visible browser instance 212 by sending and receiving data across a computer network. The network content may be received in response to a network request, such as a Hypertext Transfer Protocol (HTTP) GET request. The network content may be provided in a markup language, such as Hypertext Markup Language (HTML). The network content may also include various scripts, data, forms, and the like viewable and/or executed in the visible browser instance 212, including interactive and/or executable content such as ADOBE FLASH content, JAVASCRIPT content, and the like.

The browser 210 may further comprise a hidden browser instance 214. The hidden browser instance 214 provides a browser instance within which network content identified by a prerender controller 218 may be loaded. The network content identified by the prerender controller 218 may take the form of content that the user is likely to access during a browser session, such as a web page for initiating a search query or displaying search results, a user webmail page, or any other content that a user is likely to return to one or more times during the browsing session. The hidden browser instance 214 may include a start page for a search engine wherein non-search-result data (e.g., page formatting, logos, images, style sheets, scripts, and the like) has been requested and rendered by the prerender module 210. The preloaded search page may be stored such that the preloaded search page is not visible to a user until the user provides a search query. The hidden rendering environment refers to any representation that does not have an immediately apparent interface for the user. For example, the preloaded search page may be stored within a browser "tab" that does not have an associated selection control in a web browser tab interface. The hidden browser instance 214 may be accessible via a menu or interface command, and in response to the selection of this interface command an interface for the prerendered content is generated, such as by adding a selection control for the prerendered content to the browser tab interface. The hidden rendering environment may also be provided by a variety of other methods suitable to receive and render the page environment while avoiding distraction of the user with potentially irrelevant content. The network content loaded in the hidden browser instance 214 may be stored in a completely executed and rendered format. For example, any executable code, scripting language, multimedia files, and/or interactive objects may be fully requested and loaded in the prerendering environment provided by the hidden browser instance. Where the hidden browser instance 214 stores a preloaded search page, if the user enters a search query, the browser 210 may execute the search query using the preloaded search page, and merge the preloaded search page with the visible browser instance 212. Search results responsive to the search query may thus be provided without the need to request the elements of the search engine results page (e.g., page structure, scripts, or other non-search result content) or wait for the search engine results page to render. Throughout this process the preloaded search page may issue the query over the network to the search engine, receive data providing results for the search query, blend the results into the preloaded search page, and make itself visible.

The prerender controller 218 may control preloading and prerendering operations performed within the web browser. For example, after a preloaded search page is merged with the visible browser instance 212, the prerender controller 218 may reprime the hidden browser instance 214 with a new instance of the preloaded search page to prepare for a new search query. The prerender controller 218 may perform these operations at particular intervals, such as on a timer (e.g., every 30 seconds), instantly upon merging the hidden browser instance with the visible browser instance, in response to network traffic, or in response to an indication from the server hosting the network content.

The prerender controller 218 may also be configured by prerender configuration settings 220. These prerender configuration settings 220 may control when and how the prerender controller performs prerender operations. For example, the prerender configuration settings 220 may specify a particular set of network content (e.g., a URL) to be preloaded in the hidden browser instance 214, such as a search engine home page, a user webmail access page, or a search engine results page. The prerender configuration settings 220 may also specify a frequency with which to prerender (e.g., a time interval to reprime the hidden browser instance after merging with the visible browser instance), a system resource level to perform preloading, or any other setting to assist the user with adjusting the prerendering operations to meet a particular set of needs or preferences.

The web browser 210 may further comprise a search application programming interface (API) 216. Although the specific example described herein relates to the use of a search API for interfacing with a preloaded search page loaded in the hidden browser instance 214, the same concepts may apply to the use of other page APIs, such as a user homepage or webmail page configured to accept commands or instructions via other APIs. The search API 216 allows for a scripted interface with the content loaded in the hidden browser instance 214. When the browser 210210 detects a search query (e.g., entered into a text field provided by the browser), the browser 210 may pass the search query to the preloaded search page using the search API 216. For example, the search query may be passed to the preloaded search page using an asynchronous JavaScript (AJAX) and extensible markup language protocol. The network content stored within the hidden browser instance 214 may be specifically configured to communicate in this manner, allowing the client computing device 200 to interface with the network content without the need to navigate to a new URL to perform the action (e.g., to provide a search query to a preloaded search page). The search API 216 may be configurable within the browser 210. For example, a user may specify a particular search engine for use in search operations performed by the browser.

Figure 3:
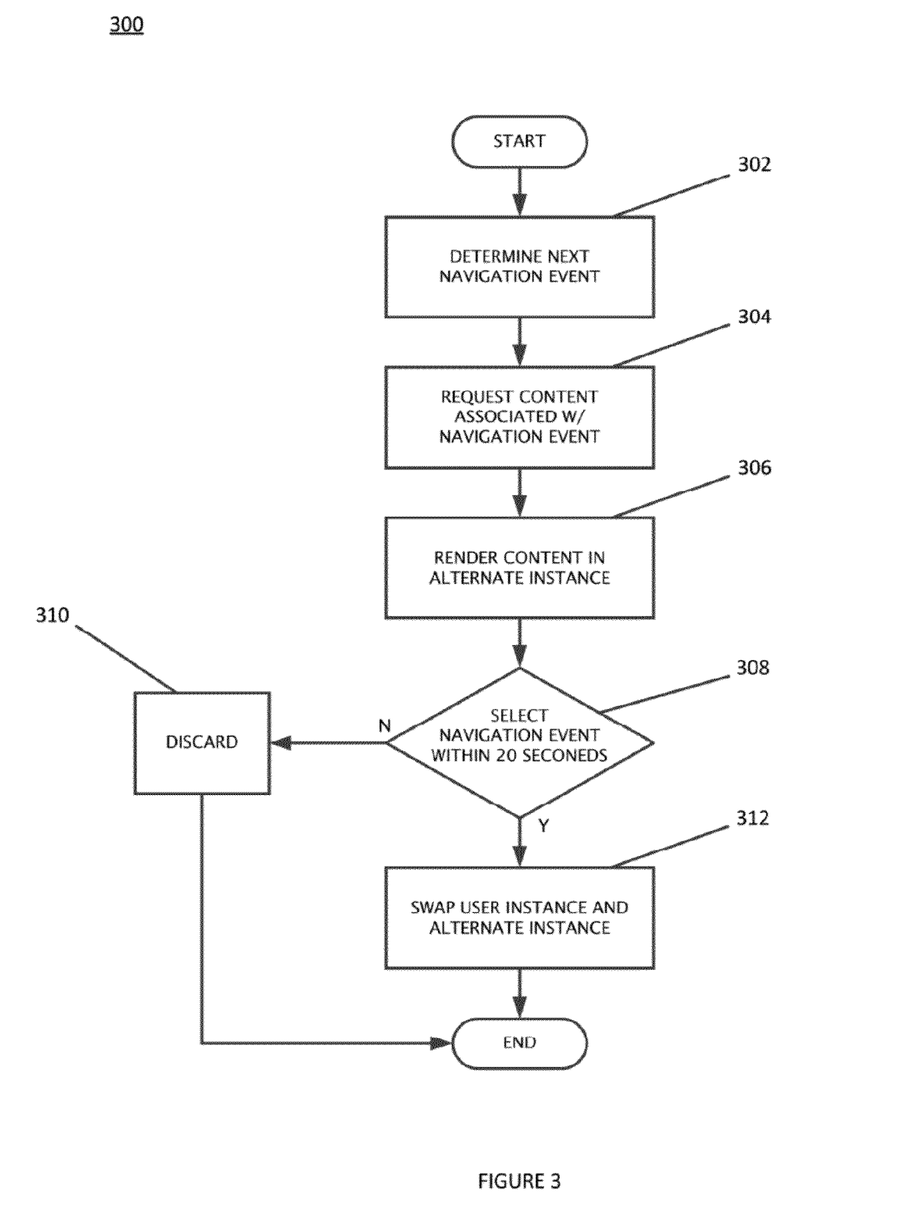
FIG. 3 is a flow diagram depicting an example method for prerendering network content in accordance with aspects of the disclosure.

FIG. 3 is a flow diagram depicting an example method 300 for prerendering a web page, such as network content executed and stored within the hidden browser instance 214, in accordance with aspects of the disclosure. Aspects of the method 300 operate to minimize load times for network content by requesting the network content prior to the user navigating to said network content. The method 300 may be performed by a computing device, such as the computing device 200, to eliminate delays in the user search experience by prerendering a search page in a hidden browser instance prior to the user entering a search query. For example, the method 300 may be performed by elements of the browser 210. While aspects of the method 300 are described with respect to the computing device 200, the method 300 may also be performed by the server 104, or any device with hardware and/or software designed to accept instructions.

At stage 302, the computing device 200 determines a next navigation event, such as a predicted search operation or links associated with a search result, within a web browser. The next navigation event may be received from a navigation prediction element (e.g., a software module that may be configured to identify when the user intends to perform a search operation for the purpose of prerendering search results prior to the entry of the search operation), or the next navigation event may be embedded within the web page displaying within the web browser. In some aspects, a search engine may embed one or more HTML prerender tags within a set of search results to indicate that a particular link associated with the most relevant result should be prerendered by the web browser. For example, the HTML for a link to an example website e.com in a search result may be modified from "<a href=http://www.e.com>" to "<link rel="prerender" href="http://www.e.com"/>" by the search engine indicating that the search result is a good candidate for prerendering. According to aspects herein, the search results may be prerendered allowing for immediate display of search results as they are received in response to a search query. In this regard, aspects of the disclosure may prerender all or part of a page associated with the prerender tags in a hidden browser instance to facilitate instant display of the search results.

At stage 304, the computing device 200 requests the content associated with the next navigation event identified at stage 302. The request may comprise a hypertext transfer protocol (HTTP) GET request, a file transfer protocol (FTP) request, or any other network data access request as known in the art. A first set of web content may be provided in response to a HTTP GET request, which may then lead to additional HTTP GET requests in accordance with the first set of web content. For example, a HTTP GET request may result in a base search page being sent to the web browser, which may trigger other page loading operations, such as additional GET requests. The base search page may have multiple embedded images, which are then fetched and rendered using HTTP GET requests for each image. The prerendering process as described may request the full search page, including associated scripts, and then execute those scripts.

At stage 306, the computing device 200 renders content associated with the navigation event determined at stage 302. The content may be rendered in an alternate instance of the web browser that is hidden from the user. For example, the content may be rendered by an alternate process or in a hidden web browser tab.

In some aspects, the rendered content may include a redirection operation. An example of a redirection operation is when the act of loading a first page, for instance, www.a.com, causes the browser to load a second page, such as www.b.com. Redirection may occur in response to a HTML tag, a JAVASCRIPT navigation command, or the like. In the case a prerendered page requests a redirection operation, said redirection operation would also occur in the alternate instance.

In some aspects, a first redirection operation may lead to subsequent redirections. For example, www.a.com may lead to www.b.com, which leads to www.c.com. Aspects of the system and method may account for this fact, such as by storing a history of redirection operations and prerendering the last page in a series in response to a first page being identified to prerender. In some aspects, the method 300 may short-circuit redirection operations by not prerendering intermediate pages when the destination result page (i.e. the page at the end of the redirection operations) is known, and only prerendering the final page in the series.

At stage 308, the computing device 200 may determine whether the user has selected the link identified at stage 302 or performed a predicted search operation within a particular time period. For example, the method 300 may wait for 10 seconds, 20 seconds, 30 seconds, one minute, 5 minutes, or any other time frame. In some aspects, the time frame may be configurable within an options menu associated with the web browser. The time frame may also be specified by the server 104. In some aspects, the server 104 may embed a timeout value with a prerender tag, indicating the length of time the content associated with the tag should be held before being discarded. For example, the HTML script for a link to an example website e.com in a search result may be modified from "<a href=http://www.e.com>" to "<link rel="prerender" timeout=10 href="http://www.e.com"/>" by the search engine indicating that the rendering candidate from the search results can be held for 10 seconds. If the user has selected the link within the time period, the method 300 proceeds to stage 312. Otherwise, the method 300 proceeds to stage 310.

At stage 310, the computing device 200 discards the prerendered content. The prerendered content is allowed to expire in this manner in order to free up system resources associated with the prerender operation and prevent the user from being presented with stale data. In some aspects, a different expiration period may be specified for different types of data. For example, data that is likely to rapidly change, such as breaking news articles, stock quotes, syndication feeds, and the like, is more likely to grow stale quickly, and might be associated with a shorter expiration timer, such as 10 seconds, 20 seconds, or one minute. Data that is less likely to change, such as reference articles, archives, box scores, and the like, might be associated with a longer expiration timer, such as an hour, 6 hours, 24 hours, a week, or the like. In some aspects, the wait time is based on a page type. For example, if the user is viewing a lengthy news article, a longer wait time may be specified when prerendering a next page of the article to provide the user time to read the current page of the article before selecting the next page. In some aspects, the wait time is determined by a time-to-live (TTL) parameter associated with a prerendering tag embedded within the page. In some aspects, the wait time is hard coded within the browser. The method 300 then ends after the prerendered content is discarded, though in some aspects the method 300 may repeat indefinitely as the user browses web content.

At stage 312, the computing device 200 merges the alternate instance containing the prerendered content into the visible user instance, in response to the user selecting the link identified at stage 302 or performing the predicted search operation (e.g., next navigation events). In this manner, the computing device 200 displays the content associated with the navigation event instantly, without a delay while the page data is requested from and received from the host server and rendered. Even if rendering has not been completed, search result pages may be merged into the search page as the results are received from a server. In some aspects, the user may select the navigation event prior to the prerendering operation completing. In such cases, the partially loaded page would be merged into the current user instance. The partially loaded page would then continue to load in the current user instance as normal. The method 300 then ends after making the prerendered content available to the user.

Figure 4:
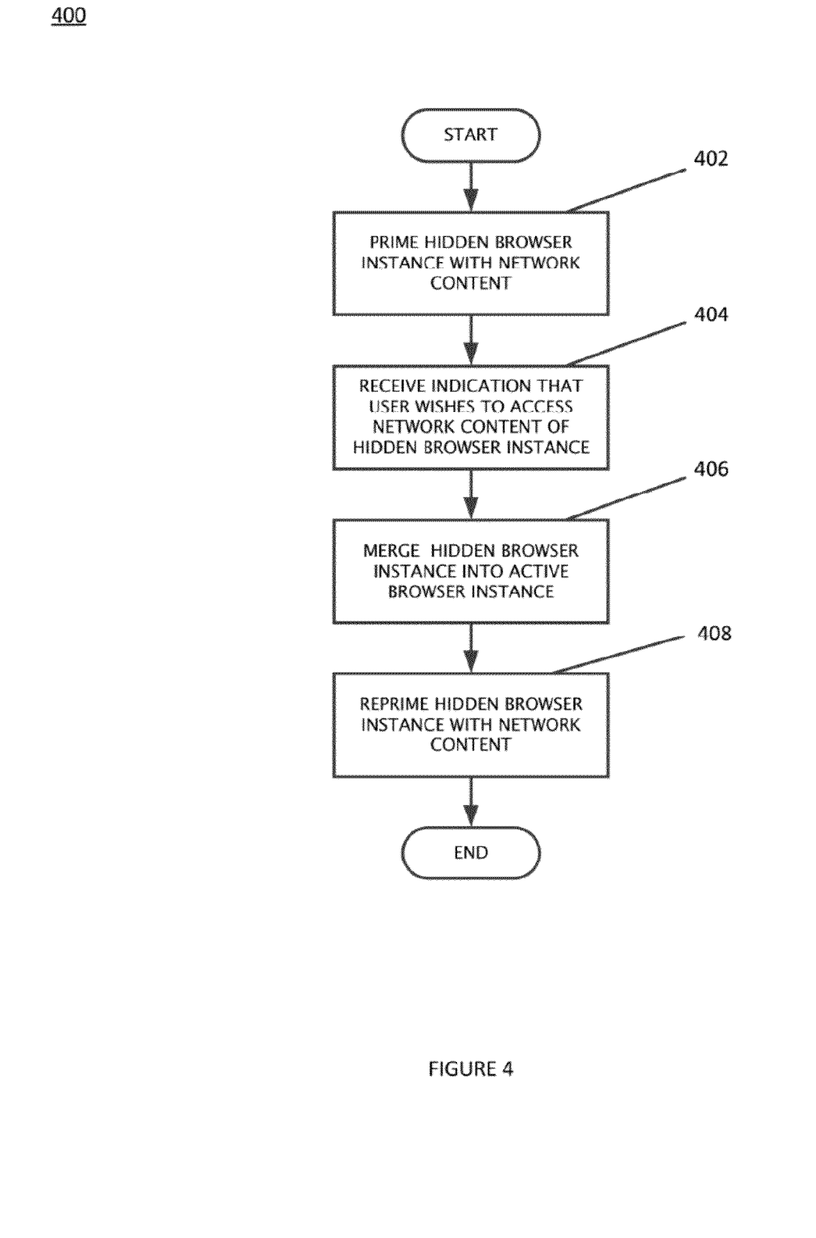
FIG. 4 is a flow diagram depicting an example method for priming a hidden browser instance with network content in accordance with aspects of the disclosure.

FIG. 4 is a flow diagram depicting an example method 400 for priming a hidden browser instance with network content in accordance with aspects of the disclosure. According to aspects herein, priming may involve loading regularly accessed network content into a hidden browser instance in a completely executed and rendered format. By preloading the regularly accessed content in a hidden browser instance, the method ensures that users experience a minimum of wait time when performing commonly done operations such as regularly conducted Internet searches, accessing the user's primary webmail account or visits to the user's home page. Such commonly viewed content may be "primed" when the browser is first executed to prepare for such access. The content that is primed and the manner in which it is accessed may be determined by various methods, including particular configuration settings or preferences. The network content may be associated with a particular security state (e.g., communication via secure sockets layer), which may change during or after the prerender operation. The method 400 may include functionality to account for such changes (see FIG. 8).

At stage 402, the hidden browser instance is primed with the network content. As described above, the network content may be associated with commonly performed user activities, such as initiation of an often repeated search request, a return to the user's home page, or accessing the user's primary webmail account. The content that is primed in this manner may be determined in a variety of methods including allowing the user to specify an address or uniform resource locator (URL) in configuration settings, analysis of user navigation history to predict a most frequently visited page, or specification of a default search engine for priming. This initial priming stage may occur when the browser is initially executed.

At stage 404, an indication that the user wishes to access the network content preloaded in the hidden browser instance is received. For example, if the network content is a search engine home page, the user may select a "home" interface control. If the network content is a search page, the user may enter a search query in a text entry field or select a suggested search query, such as provided via an "Omnibox" (see FIG. 5).

In response to the selection operation received at stage 404, the hidden browser instance containing the primed (e.g., completely executed and rendered) network content is merged into the active browser instance at stage 406. The network content thus becomes accessible to the user as soon as the merge occurs, without the need to request the content from a host server.

At stage 408, the network content is reprimed (e.g., executed and rendered again) in a hidden browser instance. A new hidden browser instance may be established, or the same hidden instance that previously held the network content may be used for the new content. The network content may be requested again over the network, or it may be executed and rendered again using previously requested data. In this manner, the network content is prepared for a new user interaction, such as a new search query or a new return to the user's home page. The network content may be reprimed after a particular length of time after the initial set of network content is used, for example, a search page may be reprimed 30 seconds after each search query.

The network content may be reprimed based on other factors as well, such as immediately after use of the initial network content, based upon an access model derived from previous user navigation habits, based on a level of available system resources, or based on an indication from the server hosting for the network content. For example, the server may specify a particular "Time to Wait" or "Time to Live" before the network content is reprimed in order to manage the amount of network traffic flowing to the server from preload operations. The method 400 may end after the network content has been reprimed for use in another network access operation. The repriming operation may be performed in various manners, including copying the preloaded network content before merging the content into the active browser, or requesting a new copy of the network content from a host server.

Figure 5:
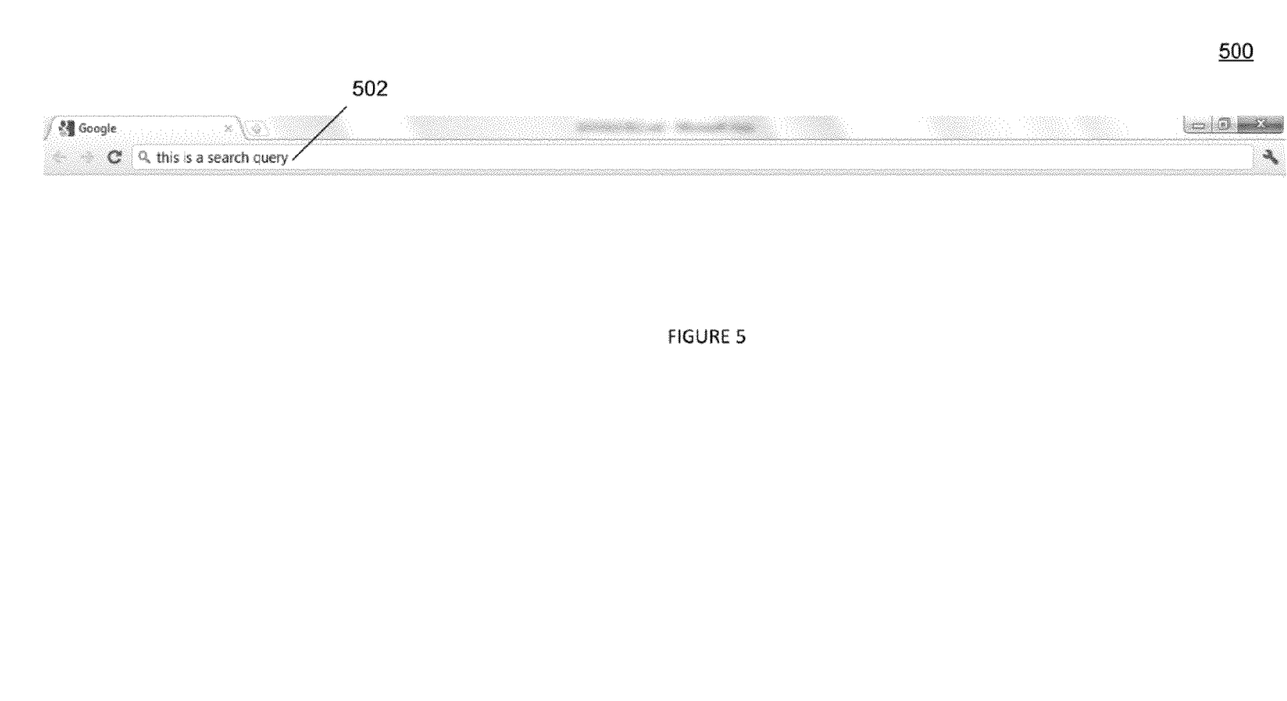
FIG. 5 is a screen capture of an example of a browser window showing the use of a text entry field for entering a search query or an address in accordance with aspects of the disclosure.

FIG. 5 is a screen capture of an example of a browser window 500 showing the use of a text entry field 402 for entering a search query or an address in accordance with aspects of the disclosure. The text entry field 502 shown may function as an "Omnibox", allowing the user to type in a search query or a website URL. If the user enters a website URL, the browser may navigate to the URL. If the user does not enter a URL, the browser may present a list of search results associated with the entered text.

Figure 6:
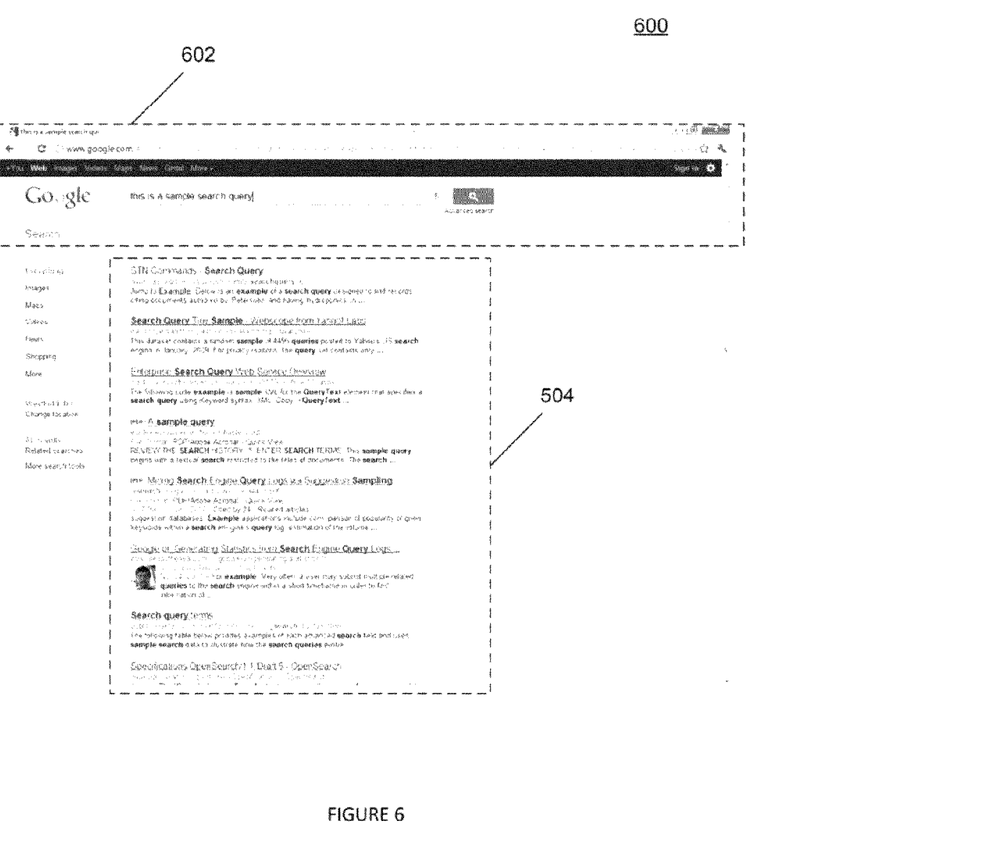
FIG. 6 is a screen capture of an example of a search page in accordance with aspects of the disclosure.

FIG. 6 is a screen capture of an example of a search page 600 in accordance with aspects of the disclosure. The search page 600 is made up of interface controls, images, and formatting data, such as the page header 602, and a set of search results 604. In pages configured to accept search queries via a search API, the search results 604 may be received separately from the rest of the page. This allows formatting data, scripts, logos, headers, style sheets, and the like, such as the page header 602, to be loaded independently from the search results 604. As such, page elements other than the search results may be rendered prior to the entry of a search query, allowing for immediate display of search results as they are received in response to a search query. Aspects of the disclosure may prerender these page elements in a hidden browser instance to facilitate instant display of search results.

Figure 7:
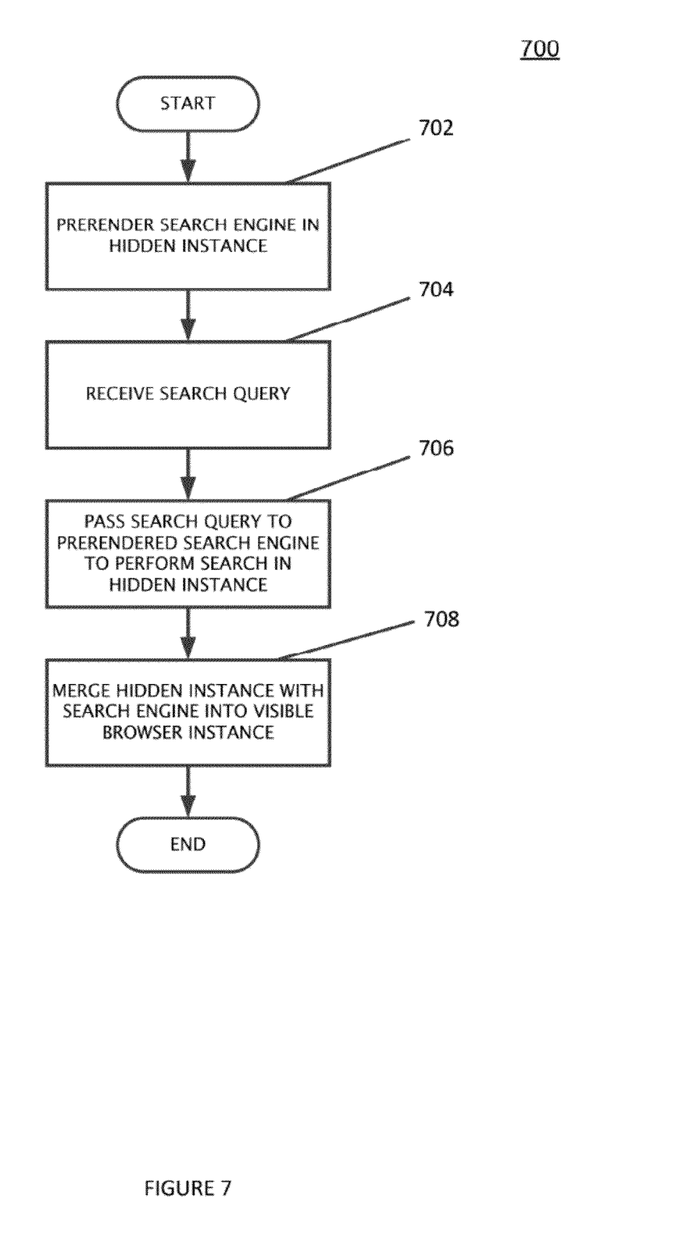
FIG. 7 is a flow diagram depicting an example of a method for prerendering a search page to improve access to search results in accordance with aspects of the disclosure.

FIG. 7 is a flow diagram depicting an example of a method 700 for preloading a search page to improve access to search results in accordance with aspects of the invention. The method 700 provides for prerendering of a search engine results page (e.g., requesting necessary resources to load a web page) in a hidden browser instance. When a search query is provided, the query is passed to the prerendered search engine via a search API, and the prerendered search engine is merged into an active browser session. In this manner, search results are provided to the user as soon as the results are received from the search engine, with no delay while the search engine results page loads. As previously discussed with respect to FIG. 4, preloaded search pages may be primed to reduce access times to search results, with a new search page preloaded after the previous search page is used to perform a search query.

At stage 702, the search engine results page is prerendered in a hidden browser instance. The search engine results page may be prerendered in response to user input, or it may be prerendered when the browser is loaded. For example, the search engine results page may be prerendered when a text entry field that accepts search queries receives focus, when the user enters at least one text character in the text entry field, or after at least one "spacebar" character is entered in the text entry field (to distinguish the text entry from a URL). The prerendering process of the search engine may include requesting any or all of page formatting instructions, images, logos, scripts, style sheets, or any other content that must be received in order to render the web page, aside from the search results responsive to the query.

At stage 704, a search query is received. The search query may be received in response to the user entering text in the text field, or the query may be identified after the user performs a selection operation, such as pressing the "enter" key after entering text in the text field. The search query may also be identified via other methods, such as by detecting a "spacebar" character in a text entry field. In some aspects, the search query is only sent to the search engine after the "enter" key has been pressed and the text string is determined to not be a URL, in order to preserve user privacy (e.g., to avoid sending URLs typed by the user for navigation purposes to the server as search engine queries).

At stage 706, the search query is passed to the prerendered search engine results page. The search query may be communicated to the prerendered search page using a search API, where the query is sent via a scripting interface. For example, the query may be sent to the search engine via an AJAX interface on the search engine results page.

At stage 708, the prerendered search page is merged into the active browser instance to display the search results. Search results may thus be instantly presented to the user as they are received from the search engine server, as the other content of the search engine results page has already been rendered.

Figure 8:
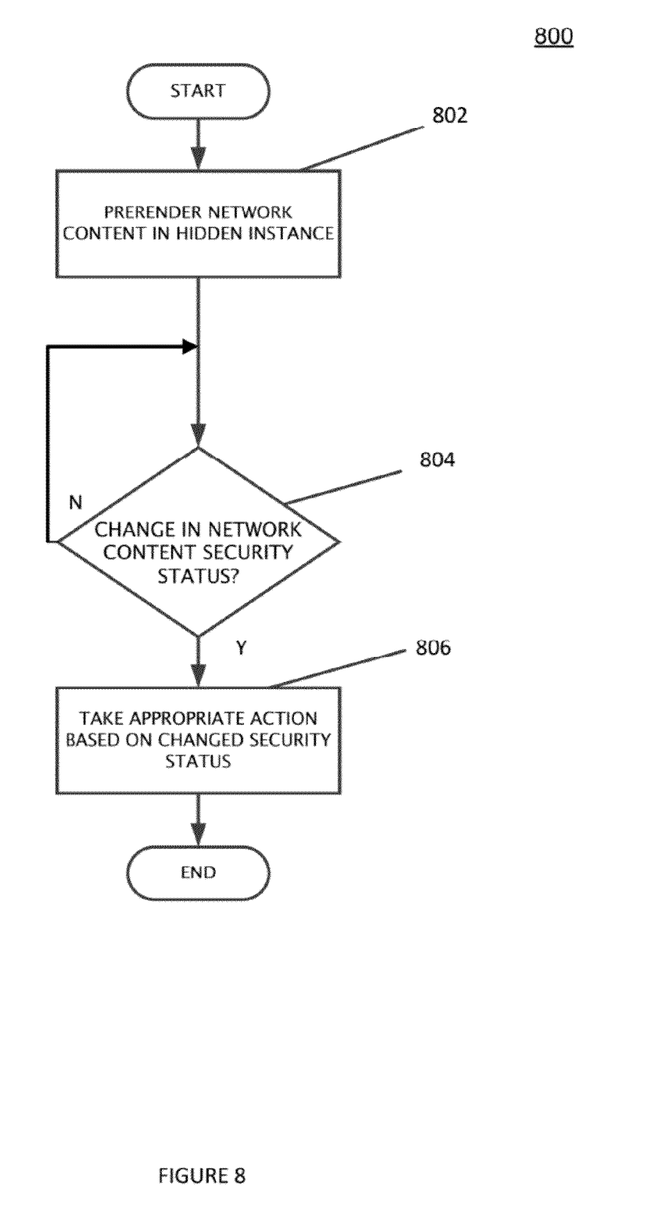
FIG. 8 is a flow diagram depicting an example of a method for evaluating a security status of prerendered network content and taking appropriate action based on the security status in accordance with aspects of the disclosure.

FIG. 8 is a flow diagram depicting an example of a method 800 for evaluating a security status of prerendered network content and taking appropriate action based on the security status in accordance with aspects of the disclosure. Network content that is prerendered in a hidden browser instance may be associated with various security features. For example, a search engine results page may allow a user to log in using credentials such that data associated with the user's account may be utilized in providing search results. When the prerendered network content exists in a secure state, data sent to and from the prerendered network content may be provided by a secure protocol, such as SSL. In some circumstances, the host page associated with the prerendered network content may shift to a secure operating environment from an insecure environment, or vice versa, after the prerendered network content has been prerendered in the hidden browser instance. In such circumstances, the prerendered content may exist in a stale state. The method 800 is operable to ensure that when the prerendered network content experiences a change in security status, the prerendered network content is updated to reflect the changed security status.

At stage 802, the network content is prerendered in a hidden browser instance. As described above, the network content may be a search engine landing page, a search engine home page, or any other type of web page that may be identified as an appropriate prerendering target. The network content may be prerendered in a particular security state. For example, if the user is logged into an account associated with their search engine, the page may be loaded in a secure environment to prevent other user search queries from being linked to the user's particular login credentials, or the search engine may display search results or other data specific to the user. If the user is not logged into their account, then the network content may display a user-agnostic version.

At stage 804, a determination is performed as to whether the security status of the network content has changed. The security status may change for a variety of reasons. For example, a user may log in to their account on another, related page in the primary browser instance, which may create a session that may also be used by the network content, or the user may be automatically logged out of their account after a particular idle time. The security status change may be identified either by code embedded within the page (e.g., a script that periodically checks the page status), or by functionality embedded within the browser that has prerendered the page.

The security status of the page may be periodically checked by a script associated with the network content. For example, the page itself may check for the presence of a session identifier to determine that a secure session has been initiated, or the page may periodically communicate with the page host to determine if the user has logged in to a related service. In some aspects, the session identifier may be a piece of data stored in a user's web browser as an HTTP cookie, web cookie, browser cookie or the like.

The security status of the network content may also be determined by the browser. The browser may periodically check for the presence of the cookie to determine if a secure session has been established. In cases where the network content is a search engine results page, the browser may be specifically configured to communicate with the particular search engine. For example, the browser may communicate with the search engine using a search API. In response to a particular API query, the search API may return a particular start page to be utilized with the search engine. For example, the search API may return a search engine start page in response to a "getdefaultsearchengine( )" request. The browser may identify whether this start page includes a "https://" identifier, which may indicate that the network content is operating in a secure environment.

The act of determining whether the security status of the network content has changed may be performed in response to a particular stimulus. For example, the determination may be performed at a particular interval. The determination may also be performed based on a user input, such as when the user begins entering text in a search box, or performs another act that may be probative that the user wishes to use the prerendered network content.

At stage 806, appropriate action is taken based on the changed security status of the prerendered network content. The appropriate action may include reloading the network content (e.g., requesting the content again from the host), or otherwise modifying the prerendered network content to take into account the changed security status. For example, an insecure instance of the network content may be replaced with a secure instance of the network content. If the network content was previously in a secure environment and has changed to an insecure environment, then the network content may not have any action performed, as issuing an insecure query via SSL may not result in a security compromise. In a scenario where the network content is a search engine results page and the page has changed from an insecure environment to a secure environment, the search engine results page may alternately issue a search query with reference to a secure page (e.g., replacing "http" with "https" in the address of the preloaded network content), rather than reloading the prerendered network content directly. In this manner, the method 800 provides for the ability to decrease access times to prerendered content while also maintaining desired security semantics for the prerendered network content.

The stages of the illustrated methods are not intended to be limiting. The functionality of the methods can exist in a fewer or greater number of stages than what is shown and, even with the depicted methods, the particular order of events may be different from what is shown in the figures.

The systems and methods described herein advantageously provide for faster display of search results while maintaining an appropriate security level for prerendered network content. Since the non-search-result content of the search engine results page is prerendered, delay associated with requesting, downloading, and rendering such content is eliminated. This allows display of search results as soon as the results are received from the search engine server. Display of search results in such a manner may save multiple seconds of delay during which the user would otherwise be idle while waiting for the page data to render. By accounting for the security status of the prerendered search engine results page, the systems and methods ensure that data is sent according to appropriate security protocols and methods while still retaining the advantages of prerendering the search engine results page. Priming a page in this manner also allows for a speed increase, as network data requests are performed up front, such that less data may be requested when the user wishes to interact with the primed page.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A method, comprising:
preloading, using a processor, a set of network content in a hidden browser instance, the set of network content configured in a first security state;
determining that the set of network content has entered a second security state different from the first security state; and
reloading the set of network content into the hidden browser instance in response to the determination that the set of network content has entered the second security state, wherein the reloading operation configures the set of network content to operate in the second security state.

2. The method of claim 1, wherein determining that the set of network content has entered a second security state is performed at a particular time interval.

3. The method of claim 1, wherein determining that the set of network content has entered a second security state is done in response to a user performing an action that indicates the user intends to interact with the set of network content.

4. The method of claim 1, wherein the determining and reloading steps are performed by a script executing in the set of network content.

5. The method of claim 1, wherein the set of network content is a search engine results page.

6. The method of claim 5, wherein the search engine results page is a default search engine associated with a browser.

7. The method of claim 6, wherein the browser performs the determining that the set of network content has entered the second security state by communicating to the default search engine via a search engine application programming interface.

8. The method of claim 5, wherein determining that the set of network content has entered a second security state is performed in response to a user entering a search query to be executed by the search engine results page.

9. The method of claim 1, wherein determining that the set of network content has entered a second security state is performed by a browser, and wherein the browser detects a session identifier associated with the set of network content to determine if a security state change has taken place.

10. The method of claim 1, wherein the first security state is an insecure browsing environment and the second security state is a secure browsing environment.

11. The method of claim 1, further comprising predicting network content to preload based on a prerender tag associated with the network content, the prerender tag indicating that the network content is a candidate for prerendering.

12. The method of claim 1, wherein a change from the first security state to the second security state is associated with a user login operation.

13. A tangible, non-transitory computer readable storage medium comprising instructions that, when executed by a processor, perform a method, the method comprising:
preloading a set of network content in a hidden browser instance, the set of network content configured in a first security state;
determining that the set of network content has entered a second security state with different from the first security state; and
reloading the set of network content into the hidden browser instance in response to the determination that the set of network content has entered the second security state, wherein the reloading operation configures the set of network content to operate in the second security state.

14. The computer readable storage medium of claim 13, wherein determining that the set of network content has entered a second security state is performed at a particular time interval.

15. The computer readable storage medium of claim 13, wherein determining that the set of network content has entered a second security state is done in response to a user performing an action that indicates the user intends to interact with the set of network content.

16. The computer readable storage medium of claim 13, wherein the set of network content is a search engine results page.

17. The computer readable storage medium of claim 16, wherein the search engine results page is a default search engine associated with a browser.

18. The computer readable storage medium of claim 17, wherein the browser performs the determining that the set of network content has entered the second security state by communicating to the default search engine via a search engine application programming interface.

19. The computer readable storage medium of claim 13, wherein determining that the set of network content has entered a second security state is performed by a browser, and wherein the browser detects a session identifier associated with the set of network content to determine if a security state change has taken place.

20. A processing system, comprising:
at least one processor coupled to a memory, the at least one processor being configured to:
preload a set of network content in a hidden browser instance, the set of network content configured in a first security state;
determine that the set of network content has entered a second security state different from the first security state; and
reload the set of network content into the hidden browser instance in response to the determination that the set of network content has entered the second security state, wherein the reloading operation configures the set of network content to operate in the second security state.

21. The processing system of claim 20, wherein the set of network content is a search engine results page.

22. The processing system of claim 20, wherein the processor is further configured to predict network content to preload based on a prerender tag associated with the network content, the prerender tag indicating that the network content is a candidate for prerendering.

* * * * *